US008650003B2

(12) United States Patent
Regnard De Lagny et al.

(10) Patent No.: US 8,650,003 B2
(45) Date of Patent: Feb. 11, 2014

(54) VALIDATION PROCESS FOR FAULT DETECTION OF A DEVICE

(75) Inventors: Joseph Regnard De Lagny, La Norville (FR); Abdelmalik Belaid, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 662 days.

(21) Appl. No.: 12/373,961

(22) PCT Filed: Jun. 29, 2007

(86) PCT No.: PCT/FR2007/051564
§ 371 (c)(1),
(2), (4) Date: Sep. 23, 2009

(87) PCT Pub. No.: WO2008/009835
PCT Pub. Date: Jan. 24, 2008

(65) Prior Publication Data
US 2010/0049473 A1    Feb. 25, 2010

(30) Foreign Application Priority Data

Jul. 17, 2006   (FR) .................................... 06 06472

(51) Int. Cl.
*G06F 15/00* (2006.01)
(52) U.S. Cl.
USPC ....... 702/183; 702/35; 73/862.23; 73/114.02; 123/479
(58) Field of Classification Search
USPC .................................... 702/35, 183; 701/111; 73/114.02–114.04, 862.23, 862.21, 73/114.06, 117.3, 116; 123/436, 481, 479
See application file for complete search history.

(56) References Cited

U.S. PATENT DOCUMENTS

| | | | | |
|---|---|---|---|---|
| 3,967,103 A | | 6/1976 | Cachuela et al. | |
| 4,318,182 A | * | 3/1982 | Bachman et al. | 718/105 |
| 5,152,182 A | * | 10/1992 | Searle | 73/862.23 |
| 5,425,340 A | * | 6/1995 | Petitbon et al. | 123/436 |
| 5,542,291 A | * | 8/1996 | James | 73/114.05 |
| 5,590,040 A | | 12/1996 | Abe et al. | |
| 5,728,941 A | * | 3/1998 | Yamamoto et al. | 73/114.04 |
| 5,747,681 A | * | 5/1998 | Kuroda et al. | 73/114.04 |
| 6,243,641 B1 | * | 6/2001 | Andrews et al. | 701/102 |
| 6,494,087 B2 | * | 12/2002 | Hatano et al. | 73/114.02 |
| 6,736,113 B1 | * | 5/2004 | Ott | 123/481 |
| 7,099,439 B2 | * | 8/2006 | Luneau | 379/27.01 |
| 7,234,094 B2 | * | 6/2007 | Kadkade et al. | 714/744 |

(Continued)

FOREIGN PATENT DOCUMENTS

EP    1 345 182    9/2003
JP    5 164819    6/1993

*Primary Examiner* — Carol S Tsai
(74) *Attorney, Agent, or Firm* — Oblon, Spivak, McClelland, Maier & Neustadt, L.L.P.

(57) ABSTRACT

A process for validating the fault detection of a device under test includes carrying out a series of basic tests of the device under test. Each basic test leads to a positive or negative result indicating normal or abnormal functioning of the device under test. The process also includes, after each realization of a basic test, updating an event counter (CRT) and updating a result counter (FCRT). Validation is performed depending on test result once the event counter has reached a first maximal value (CTRmax) or once the realization counter has reached a second maximal value (FCTRmax). The process can be performed by a diagnostic device. The process and device can monitor the electric or functional performance of more or less complex systems installed in an automobile.

7 Claims, 3 Drawing Sheets

(56) References Cited

U.S. PATENT DOCUMENTS

| | | | |
|---|---|---|---|
| 7,244,946 B2* | 7/2007 | Burnette et al. | 250/372 |
| 7,412,034 B2* | 8/2008 | Rancu et al. | 379/9 |
| 2003/0110845 A1* | 6/2003 | Kumagai et al. | 73/116 |
| 2003/0231741 A1* | 12/2003 | Rancu et al. | 379/9 |
| 2004/0002810 A1 | 1/2004 | Akuzawa et al. | |
| 2004/0107945 A1* | 6/2004 | Yeo | 123/479 |
| 2005/0081094 A1* | 4/2005 | Kadkade et al. | 714/12 |
| 2005/0247883 A1* | 11/2005 | Burnette et al. | 250/372 |
| 2006/0072709 A1* | 4/2006 | Rancu et al. | 379/9.01 |
| 2009/0261999 A1* | 10/2009 | Ramaswami et al. | 341/120 |

* cited by examiner

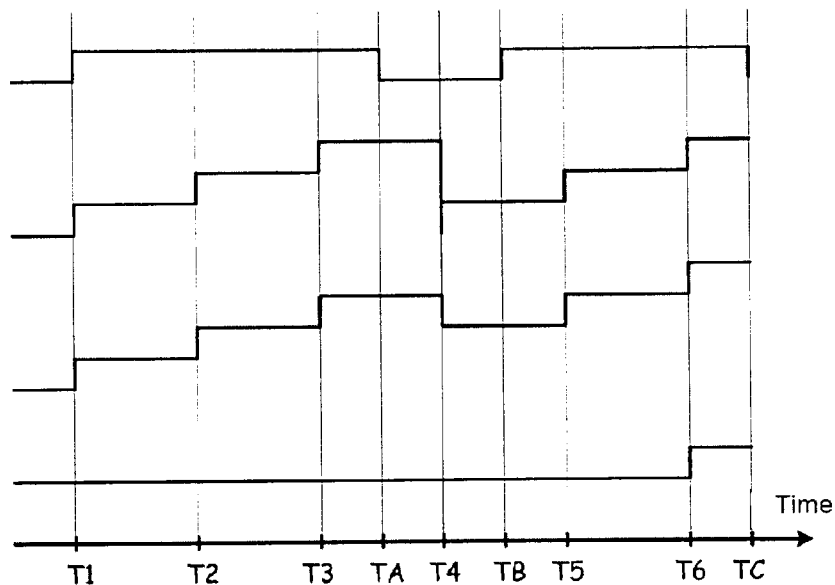
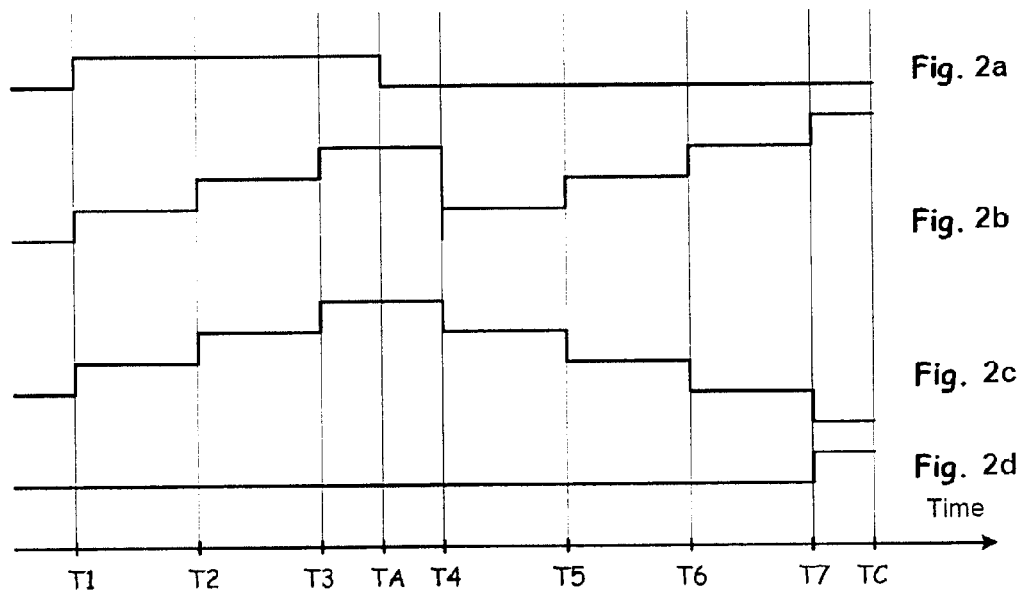

VALIDATION PROCESS FOR FAULT DETECTION OF A DEVICE

BACKGROUND

The invention relates to a method of validating an operating diagnosis of a device, during which a succession of elementary diagnoses is performed to determine the normal or abnormal operation of the device.

The invention is advantageously applicable in the automobile field, and more particularly in the field of diagnosing onboard complex mechanical or electrical control devices in an automobile. However, the invention is more generally used in the field of the operational diagnosis of any more or less complex system for which a diagnosis is valid only when particular conditions are met.

Current vehicles include numerous more or less complex mechanical or electrical devices which are controlled by appropriate control devices, commonly called onboard computers, such as, for example, the device controlling the injection system of the engine, the device controlling an automatic or robotized gearbox, etc.

To ensure the safety of the users, on the one hand, and to facilitate the rapid repair in the event of failure by a repairer on the other hand, a control device incorporates diagnostic means, appropriate for rapidly detecting a failure of the device under test (the actual control device or the electrical or operational device controlled by the control device).

The term "failure" should be understood here to mean an operating fault, likely to lead immediately or ultimately to an abnormal operation of the device under test, or a failure characterized by an abnormal operation of the device under test. The failure can be continuous or intermittent.

The diagnostic means can be activated on a one-off basis, for example at the request of a repairer to check the operation of the device under test after a repair. The diagnostic means can also be active permanently, for example to continuously monitor the device under test and issue an alert when an abnormal operation is detected.

The diagnostic means implement the following method. Elementary tests are performed at predefined instants or in predefined situations (set of parameters of the device being monitored having a predefined value), for a predefined time or a predefined number of times. The result of each elementary test indicates either an elementary fault or a normal operation of the device being monitored.

A failure is confirmed when an elementary fault has been detected once or a predefined number of times. A fault code corresponding to the failure, and other quantities linked to the operation of the device under test are then stored in a fault memory of the diagnostic means.

This stored information is used subsequently by a repairer to identify the failure and the conditions in which the failure was confirmed. After an appropriate repair according to the diagnosed failure, the fault memory is reinitialized.

Finally, an operating test and a diagnosis of the device under test, then a new reading of the fault memory make it possible to confirm repair of the device by checking that the fault dealt with has not reappeared. For this, elementary tests are performed once or a predefined number of times, then the content of the fault memory is checked to check that the fault has not reappeared.

The drawback of this method is that it does not make it possible to guarantee that the diagnosis of the device under test has been performed completely, in particular in the case of an intermittent fault.

BRIEF SUMMARY

The invention proposes a solution to this problem, by proposing a new method of validating a diagnosis of a device under test.

Thus, the invention relates to a method of validating an operating diagnosis of a device under test, during which a succession of elementary tests is performed on the device under test, each elementary test producing a positive or negative result indicating normal or abnormal operation of the device under test.

The method according to the invention is characterized in that it also comprises the following steps:
  after each performance of an elementary test, updating of an occurrence counter (CRT), and updating of a result counter (FRCT), according to the result of the elementary tests,
  validation of the diagnosis when the occurrence counter reaches a first maximum value (CTRmax) or when the performance counter reaches a second maximum value (FCTRmax).

The updating of the occurrence counter can entail:
  incrementing the occurrence counter, if the result of the elementary test is identical to the result of a preceding elementary test, or
  initializing the occurrence counter, if the result of the elementary test is in a second logic state.

The updating of the result counter can entail:
  incrementing the result counter, if the result of the elementary test is in a first logic state or
  decrementing the result counter, if the result of the elementary test is in a second logic state.

The elementary diagnoses are performed, for example, each time a set of parameters of the device takes a predefined value, or even at predefined time intervals.

The invention also relates to a diagnostic device, for diagnosing the operation of a device under test, the diagnostic device comprising means for performing a succession of elementary operating tests on the device under test, each elementary test producing a positive or negative result indicating normal or abnormal operation of the device under test.

The diagnostic device is characterized in that it also comprises:
  an occurrence counter (CRT), for counting occurrences of identical results of successive elementary tests,
  a result counter (FCRT), for counting the positive or negative results of the successive elementary tests,
  a diagnosis validation means, for producing a warning signal when the occurrence counter reaches a first maximum value (CTRmax) or when the performance counter reaches a second maximum value (FCTRmax).

The invention will be better understood and other characteristics and benefits of the invention will become apparent from the description that follows of a diagnosis validation method according to the invention.

BRIEF DESCRIPTION OF THE DRAWINGS

The description is given in relation to the appended figures in which:

FIGS. 1a to 1d diagrammatically represent the operation of one embodiment of the inventive method, FIGS. 2a to 2d diagrammatically represent the operation of another embodiment of the inventive method.

DETAILED DESCRIPTION

In the example described below, it is assumed that the device under test is a device controlling the injection system of an automobile engine. The inventive method is more generally applicable to any device under test for which there is a desire to detect any failure (operating fault or failure).

The inventive method is a method of validating an operating diagnosis of the device under test. The inventive method guarantees that the result of an operating diagnosis is reliable, whether it is positive or negative, that is, particularly in the case of a positive result, that the positive result is reproducible at least a predefined number of times.

Figure 3:
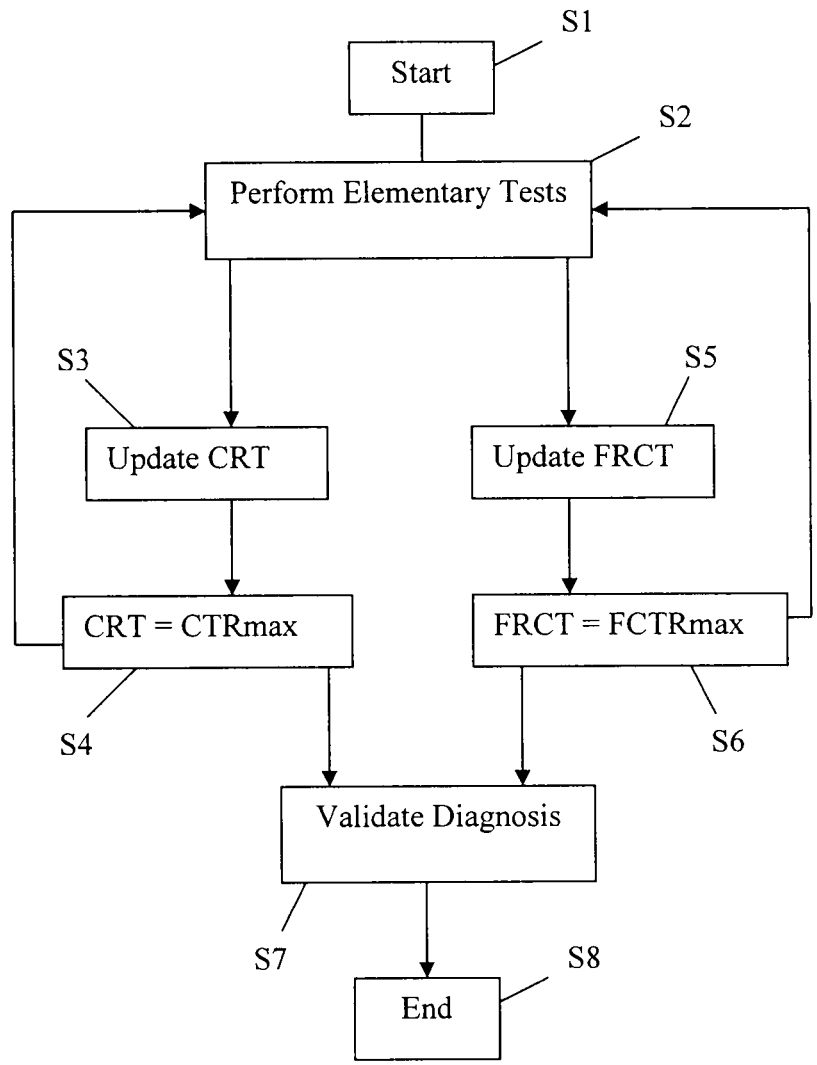
FIG. 3 shows one embodiment of a method of validating an operating diagnosis of a device.
Figure 4:
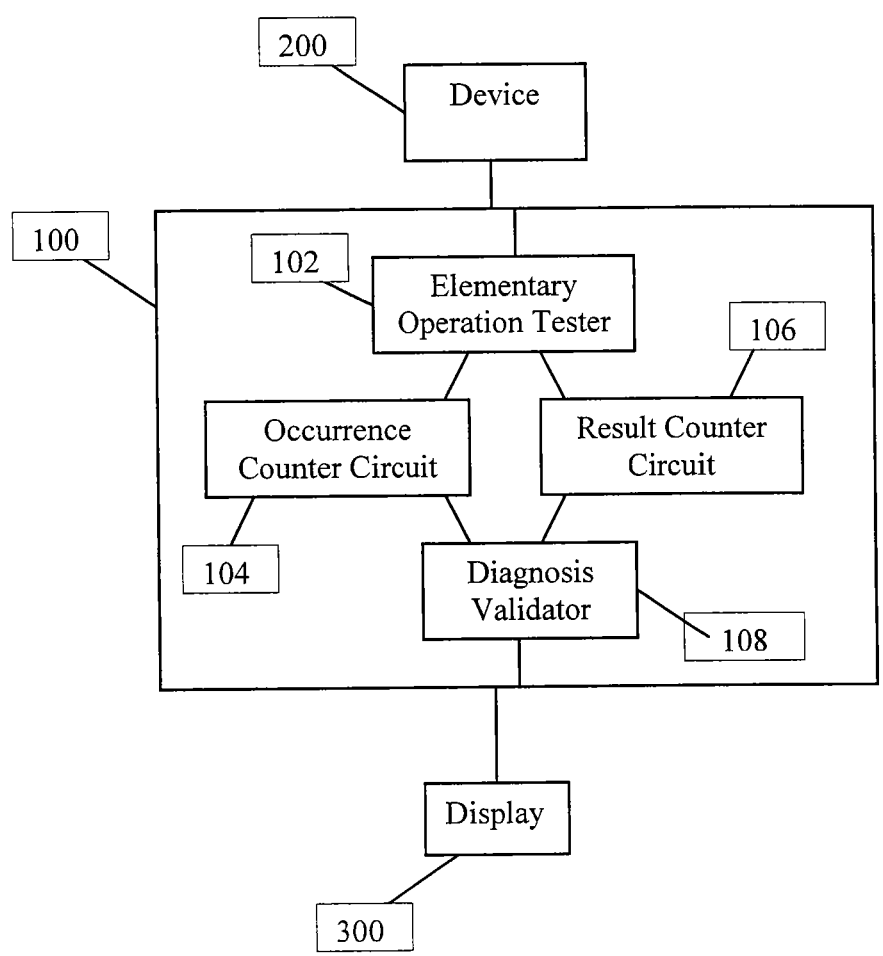
FIG. 4 shows one embodiment of a diagnostic device to validate an operating diagnosis of a device.

After being started (S1 in FIG. 3), the validation method comprises, like the prior diagnostic methods, the performance of a succession of elementary tests (S2).

During each elementary test, the operation of the device under test is tested, and a determination is made as to whether the device is operating normally or abnormally. For this, during each elementary test, values of a first set of parameters of the device are, for example, measured, and compared with expected corresponding values. The result of an elementary test is a Boolean result which takes either a negative value, indicating an abnormal operation, or a positive value, indicating a normal operation.

The elementary tests are performed at predefined instants or in predefined situations.

In one embodiment, an elementary test is performed at predefined instants T1, T2, T3, and so on.

The time interval between two elementary tests can be constant (for example, an elementary test is performed every 50 milliseconds) or indeed variable (for example, an elementary test is performed at T1=1 ms, T2=5 ms, T3=10 ms, T4=20 ms, etc.).

In another embodiment, an elementary test is performed in predefined situations, each time that a second set of parameters of the device under test takes a set of predefined values. For example, in the case of the test of a temperature sensor of a fuel injection device in an engine, an elementary test is performed each time the following conditions are met: motor speed greater than a predefined threshold, temperature of a coolant greater than a predefined threshold and estimated average torque greater than a predefined threshold.

It should be noted that the second set of parameters (the value of which is used to detect the instant when an elementary test must be performed) can differ from the first set of parameters (the value of which is used to determine the result of an elementary test).

According to the invention, after each performance of an elementary test, an update of an identical occurrences counter (S3) and an update of a result counter (S5) are performed, according to the result of the elementary test.

The value of the occurrence counter is representative of the number of successive tests giving an identical result. The value of the result counter is a function of the total number of tests giving a result indicating an abnormal operation (negative result) and the total number of tests giving a result indicating a normal operation (positive result) of the device under test.

After each elementary test, the occurrence counter is updated. The occurrence counter is incremented if the result of the current elementary test is identical to the result of a preceding elementary test. The occurrence counter is initialized to an initial value if the result of the current elementary test differs from the result of the preceding elementary test. The value CTR of the occurrence counter thus gives an indication of the number of elementary tests performed in succession and giving a stable (identical) result, which can, depending on the case, be negative, indicating an abnormal operation, or positive, indicating a normal operation.

Also, after each elementary test, the result counter is updated. The result counter is incremented if the result of the elementary test is in the first logic state (in the example, negative), and the result counter is decremented if the result of the elementary test is in the second logic state (in the example, positive). The FCTR value of the result counter thus gives an image of the number of occurrences of a negative test result versus the number of occurrences of a positive test result: if the FCRT value of the result counter is high, this means that many elementary tests performed have led to an incrementation of the counter (corresponding to a test result indicating an abnormal operation of the device being monitored). Conversely, if the FCTR value of the result counter is low, this indicates that a small number of elementary tests performed have led to an incrementation of the counter, the other tests performed having led to a decrementation.

The inventive method also comprises a diagnosis validation step, during which a diagnosis is validated if the result counter reaches a maximum value or it the occurrence counter reaches a maximum value.

After the result counter is updated in step S5, the value FRCT of the result counter is compared to the maximum value FCTRmax (S6). If the result counter reaches its maximum value FCTRmax (Yes in S6), this indicates that a fault has been detected at least FCmax times, that is, at least FCmax elementary tests have been performed and have given a negative result. In such a case, it is assumed that the diagnosis is valid (performed completely) and that its result is negative (abnormal operation), even it the result of the diagnosis is not stable. Thus, the diagnosis is validated (S7) if the result counter value FRCT reaches the maximum value FCTRmax.

If the occurrence counter reaches its maximum value CTRmax (Yes in S4), this indicates that at least Cmax successive elementary tests have given one and the same result. In this case, it is assumed that the diagnosis is valid because it is stable. Thus, the diagnosis is validated (S7) if the occurrence counter value CRT reaches the maximum value CTRmax. The result of the diagnosis is negative if the value of the result counter is less than its maximum value FCTRmax, or positive otherwise.

If the result counter value FRCT does not reach the maximum value FCTRmax (no in step S6) and the occurrence counter value CRT does not reach the maximum value CTRmax (no in step S4), then the method returns to step S2 and the next elementary test in the succession of elementary tests is performed.

The validation step according to the invention makes it possible to validate a diagnosis, that is, to guarantee that the result of the diagnosis is stable, at least if this result is positive, and including in the case where intermittent elementary faults (=negative results of elementary tests) are present.

The validation step (S7) can include the production of a validation signal VAL, indicating that a diagnosis is validated (its result being positive or negative). A user of the device is thus informed that a valid diagnosis has been performed. The result of the diagnosis can be accessed in the fault memory, or even be displayed automatically for the user to look at. In the chosen example in which the device under test is a device controlling the injection system of a vehicle engine, it is possible, for example, to provide on the dashboard of the vehicle a screen display or a light button for displaying the signal VAL. After the validation step (S7) is complete, the method of validating the operating diagnosis is complete (S8).

The result counter can be incremented by a first increment value or can be decremented by a decrement value. The occurrence counter can be incremented by a second increment value.

The choice of the first increment value, of the second increment value, of the decrement value and of the values CTRmax, Cmax, FCTRmax, FCmax, depends on the choice of the parameters to be checked to validate a test, and the technological choices made for implementing the counters.

The validation criteria of a test dictate the values of the parameters CMax and FCmax.

It is assumed that a diagnosis is valid if it is stable, that is, if at least CMax successive elementary tests give the same result. Depending on the device under test, it will be possible to choose, for example, CMax to be of the order of 5 to 1000. It is assumed that a diagnosis is also valid if FCmax elementary tests, successive or otherwise, give a negative result. It is assumed in fact, in this case, that the large number of negative results must be considered as a negative diagnosis requiring an intervention, even if the diagnosis is not stable. Depending on the device under test, it will be possible to choose, for example, FCmax to be of the order of 5 to 1000.

The technological choices for the implementation of the counters dictate the values of the parameters CTRmax and FCTRmax.

In a first embodiment, the values CTRmax and FCTRmax are maximum values that can be produced by the occurrence counter and the result counter. For example, if the counters are 16-bit counters, CTRMax and FCTRmax are equal to $2^{16}=65536$.

In a second embodiment, CTRMax and FCTRmax values are chosen to be equal respectively to Cmax and FCmax. In this case, an appropriate comparator is used at the output of the occurrence counter to compare the value of the occurrence counter with the CTRMax value and an appropriate comparator for comparing the value of the result counter with the FCTRmax value is used at the output of the result counter.

To increment the occurrence counter, the first increment value is chosen to be equal to CTRMax/Cmax. Thus, it Cmax successive elementary tests produce one and the same result, the occurrence counter reaches its maximum value CTRMax.

To increment the result counter, the second increment value is chosen to be equal to FCTRMax/FCmax.

The second increment value can be different from the first increment value.

To decrement the result counter, the decrement value can be chosen freely to be less than, equal to or greater than the second increment value, depending on the importance that is attached to a positive elementary test result compared to a negative result. The ratio between the second increment value and the decrement value thus makes it possible to weight the importance of a positive result relative to a negative result. For example, it may be decided that a negative result is twice as important as a positive result, and must be compensated by two positive results to be "cancelled out".

FIGS. 1a to 1d show a situation in which the first increment value, the second increment value and the decrement value are identical, equal to 1 in a numerical example. The elementary tests are performed at regular intervals, in one example every $\Delta T=50$ ms. The maximum values of the counters are FCmax=Cmax=4 (this maximum number, purely arbitrary in this case, is deliberately chosen to be small for obvious reasons of simplification).

FIG. 1a shows the operation of the device under test. At the instant T1, the device is started up, and it is stopped at the instant TC. Between the instants T1 and TA, it is assumed that the device is not operating correctly (negative signal, equal to 1). Between the instants TA and TB, it is assumed that the device is operating normally (positive signal, equal to 0). Between the instants TB and TC, the device is not operating normally (negative signal, equal to 1).

In this practical example, the inventive method operates as follows.

At the instant T1, the method is activated, on power up, on starting up the device under test. A first elementary test is performed, the result of which is negative (=1 in FIG. 1a, indicating a fault). The occurrence counter is incremented (CTR=1, FIG. 1b) and the result counter is incremented (FCTR=1, FIG. 1c).

At the instant $T2=T1+\Delta T$, a second elementary test is performed, the result of which is negative. The occurrence counter is incremented (CTR=2, FIG. 1b) and the result counter is incremented (FCTR=2, FIG. 1c).

At the instant $T3=T2+\Delta T$, a third elementary test is performed, the result of which is negative. The occurrence counter is incremented (CTR=3, FIG. 1b) and the result counter is incremented (FCTR=3, FIG. 1c).

At the instant $T4=T3+\Delta T$, between TA and TB, a fourth elementary test is performed, the result of which is positive (normal operation of the device under test), the result (positive) being different from the result (negative) of the preceding test. The occurrence counter is initialized to one (CTR=1, FIG. 1b). Since the result is positive, the result counter is decremented (FCTR=2, FIG. 1c).

At the instant $T5=T4+\Delta T$, greater than TB, a fifth test is performed, the result of which is negative. The occurrence counter CTR is incremented (CTR=2, FIG. 1b) and the result counter is incremented (FCTR=3, FIG. 1c).

At the instant $T6=T5+\Delta T$, a sixth test is performed, the result of which is negative. The occurrence counter CTR is incremented (CTR=3, FIG. 1b) and the result counter is incremented (FCTR=4, FIG. 1c) and reaches its maximum value (FCTR=FCTRmax). The validation signal is activated (FIG. 1d). Since the result counter has reached its maximum value, it is assumed that the diagnosis is valid, the result of the diagnosis being negative (abnormal operation of the device under test confirmed).

The method ends when the device under test is stopped. It is reinitialized on a subsequent powering-up of the device under test (instant TC).

FIGS. 2a to 2d show, by way of example, a situation in which the first increment value and the second increment value are identical and equal to 1, the decrement value is equal to ½. The elementary tests are performed at regular instants T1, T2, T3, etc., in one example every $\Delta T=50$ ms. The maximum values of the counters are FCmax=CMax=4.

FIG. 2a shows the operation of the device under test. At the instant T1, the device is started up, and it is stopped at the instant TC. Between the instants T1 and TA, it is assumed that the device is not operating correctly (negative signal, equal to 1). Between the instants TA and TC, it is assumed that the device is operating normally (positive signal, equal to 0).

In this practical example, the inventive method operates as follows.

At the instant T1, the method is activated, on power up, when the device under test is started up. A first elementary test is performed, the result of which is negative (=1 in FIG. 2a, indicating a fault). The occurrence counter is incremented (CTR=1, FIG. 2b) and the result counter is incremented (FCTR=1, FIG. 2c).

At the instant T2=T1+ΔT, a second elementary test is performed, the result of which is negative. The occurrence counter is incremented (CTR=2, FIG. 2b) and the result counter is incremented (FCTR=2, FIG. 2c).

At the instant T3=T2+ΔT, a third elementary test is performed, the result of which is negative. The occurrence counter is incremented (CTR=3, FIG. 2b) and the result counter is incremented (FCTR=3, FIG. 2c).

At the instant T4=T3+ΔT, greater than TA, a fourth elementary test is performed, the result of which is positive (normal operation of the device under test), the result (positive) being different from the result (negative) of the preceding test. The occurrence counter is initialized at one (CTR=1, FIG. 2b). Since the result is positive, the result counter is decremented (FCTR=2.5, FIG. 2c).

At the instant T5=T4+ΔT, a fifth test is performed, the result of which is positive. The occurrence counter CTR is incremented (CTR=2, FIG. 2b) and the result counter is decremented (FCTR=2, FIG. 2c).

At the instant T6=T5+ΔT, a sixth test is performed, the result of which is positive. The occurrence counter CTR is incremented (CTR=3, FIG. 2b) and the result counter is decremented (FCTR=1.5, FIG. 2c).

At the instant T7=T6+ΔT, a seventh test is performed, the result of which is positive. The occurrence counter CTR is incremented (CTR=4, FIG. 2b) and the result counter is decremented (FCTR=1, FIG. 2c). Since the occurrence counter has reached its maximum value (CTR=CMax), the validation signal is activated (FIG. 2b). Since the occurrence counter has reached its maximum value, it is assumed that the diagnosis is valid because the results of the elementary tests are stable. The result of the diagnosis in this example is positive, because the value of the result counter is less than its maximum value. The normal operation of the device under test is thus confirmed.

The method ends when the device under test is stopped. It is reinitialized on a subsequent powering-up of the device under test (instant TC).

The invention also relates to a diagnostic device 100, for diagnosing the operation of a device under test 200. The diagnostic device can be, for example, incorporated in the device under test, or even be appended to the device under test.

The diagnostic device comprises means 102 for performing a succession of elementary operating tests on the device under test, each elementary test producing a positive or negative result indicating normal or abnormal operation of the device under test.

The diagnostic device according to the invention also comprises:
- an occurrence counter CRT 104, for counting occurrences of identical results of successive elementary tests,
- a result counter FCRT 106, for counting the positive or negative results of the successive elementary tests,
- a diagnosis validation means 108, for producing a warning signal on a display 300 when the occurrence counter reaches a first maximum value CTRmax or when the performance counter reaches a second maximum value FCTRmax.

The invention claimed is:

1. A method of validating an operating diagnosis of a device under test, comprising:
    performing a succession of elementary tests on the device under test, each elementary test producing a positive or negative result indicating normal or abnormal operation of the device under test,
    after each elementary test is performed, updating an occurrence counter (CRT), and simultaneously updating a result counter (FRCT), according to the result of the elementary tests, and
    validating the diagnosis when the occurrence counter reaches a first maximum value (CTRmax) or when the performance counter reaches a second maximum value (FCTRmax),
    wherein the updating the occurrence counter, for each elementary test, includes:
        determining the result of the elementary test,
        incrementing the occurrence counter in response to the result of the elementary test being a first logic state that is identical to the result of a preceding elementary test, and
        initializing the occurrence counter in response to the result of the elementary test being in a second logic state that is different from the result of the preceding elementary test, and
    wherein the updating the result counter, for each elementary test, includes:
        incrementing the result counter, if the result of the elementary test is in the first logic state, and
        decrementing the result counter, if the result of the elementary test is in the second logic state.

2. The method as claimed in claim 1, in which:
    the incrementing includes, on each incrementation, increasing a value of the result counter by a predefined increment value, and
    the decrementing includes, on each decrementation, reducing the value of the result counter by a predefined decrement value.

3. The method as claimed in claim 2, in which the decrement value is less than or equal to the increment value.

4. The method as claimed in claim 1, in which the succession of elementary tests is performed each time a set of parameters of the device is equal to a predefined value.

5. The method as claimed in claim 1, in which the succession of elementary tests is performed at predefined time intervals.

6. The method as claimed in claim 1, in which:
    the device under test is a temperature sensor of a fuel injection device, and the succession of elementary tests is performed each time motor speed is greater than a predefined motor speed threshold, temperature of coolant is greater than a predefined coolant temperature threshold, and estimated average torque is greater than a predefined torque threshold.

7. A diagnostic device, for diagnosing an operation of a device under test, the diagnostic device comprising:
    means for performing a succession of elementary operating tests on the device under test, each elementary test producing a positive or negative result indicating normal or abnormal operation of the device under test, each test utilizing
    an occurrence counter (CRT) to count occurrences of identical results of successive elementary tests, wherein, for each elementary test, the occurrence counter determines the result of the elementary test and the count of the occurrence counter is increased in response to the result of the elementary test being a first logic state that is identical to the result of a preceding elementary test, and the count of the occurrence counter is initialized in response to the result of the elementary test being in a second logic state that is different from the result of the preceding elementary test, a result counter (FCRT) to count the positive or negative results of the successive elementary tests, wherein, for each elementary test, the result counter determines the result of the elementary test and the count of the result counter is increased in response to the result of the elementary test being the first logic state, and the count of the result counter is decreased if the result of the elementary test is in the second logic state, and a diagnosis validator to produce a warning signal when the occurrence counter reaches a first maximum value (CTRmax) or when the performance counter reaches a second maximum value (FCTRmax), wherein, after each test is performed, the occurrence counter and the result counter are simultaneously updated according to the result of the elementary test.

* * * * *